Nov. 13, 1928.
C. H. LOUTREL
1,691,444
COMPRESSION SPRING WASHER
Filed March 27, 1928
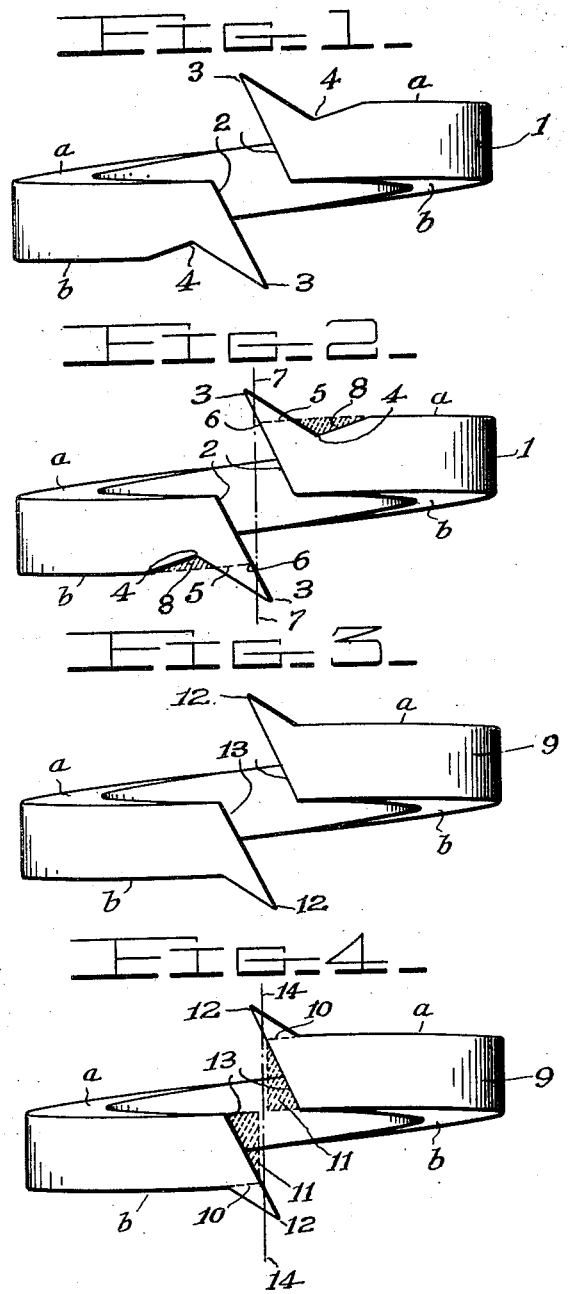
Inventor
Cyrus H. Loutrel
by
Attorney Patented Nov. 13, 1928.

1,691,444

UNITED STATES PATENT OFFICE.

CYRUS H. LOUTREL, OF SOUTH ORANGE, NEW JERSEY, ASSIGNOR TO THE NATIONAL LOCK WASHER COMPANY, OF NEWARK, NEW JERSEY, A CORPORATION OF NEW JERSEY.

COMPRESSION SPRING WASHER.

Application filed March 27, 1928. Serial No. 265,071.

My invention relates to compression spring washers of the type shown and described in Letters Patent No. 1,655,018, issued to me January 3, 1928.

The washers shown and described in this patent were so constructed that they would not interlink when packed in bulk, and two of the ways referred to, in which washers would ordinarily interlink even when the distance between the angularly disposed ends was less than the smallest cross section diameter of the washer stock, were, first, when the washers were less than 360° in circumference, and, second, when two of such washers are moved toward each other at an angle with their end faces in juxtaposition so as to be opposed to each other.

The way to prevent this first manner of interlinking is by making the helical segments more than 360° in circumference, and the second manner of interlinking can be prevented by decreasing the distance between the end faces of the washer, and this can be brought about by increasing the length of the segment.

The object of the present invention is to prevent the interlinking of the washers in these two ways without really increasing the length of the segment, but by merely lengthening the angular faces of the washer, so that a washer that is ordinarily less than 360° in circumference, would be more than 360° in circumference when the faces were lengthened.

Referring to the accompanying drawing

Figure 1 is an elevation of one form of my improved washer.

Figure 2 is an elevation of a washer illustrating one way in which the washer shown at Figure 1 is formed.

Figure 3 is an elevation of another form of my improved washer, and

Figure 4 is an elevation illustrating one way in which the washer shown at Figure 3 is formed.

Similar numerals of reference denote like parts in the several figures of the drawing.

Referring to Figure 1, 1 generally denotes the washer which is made of stock substantially rectangular in cross section and whose surfaces are denoted by $a$ and $b$ and whose end faces 2 are angularly disposed and terminate in elongated spurs 3 which merge into the body of the washer.

The washer is depressed as shown at 4 at the locations where these spurs merge into it.

Referring particularly to Figure 2, which shows in solid lines the washer illustrated at Figure 1, an ordinary washer is indicated by the dotted lines 5, it being assumed that the spurs 3 are cut off at the dotted lines.

Therefore, assuming that we have a washer the length of whose end faces is bounded by the dotted lines and the opposite surfaces $a$ and $b$ of the washer, the acute angled terminals of these faces would be denoted by the numeral 6. Also, there would be no depressions 4 in the washer, and the length of the segment forming this washer would be less than 360°, as is evidenced by the perpendicular line 7, and this washer thus defined would interlink when two of such washers were approached in parallelism, since the end faces would readily pass each other.

By forcing out from the surfaces of the washer the stock shown in dotted lines and denoted by the numeral 8 and swaging this stock into the ends of the washer so as to form the spurs 3, the angular faces are extended beyond the two respective faces of the washer and the spur-like portions which terminate them overhang and extend beyond the perpendicular line 7, so that a washer is formed that is more than 360° in circumference, since the combined circumferences of the top and bottom of the washer when projected would be greater than 360°, and therefore the washer shown at Figure 1 and made in the manner just described would not interlink.

It will be noted that this is brought about by not increasing the helical segment which forms the washer but by merely extending the angular faces of the washer.

A washer, such as is shown at Figure 2 and defined by the dotted lines, would be less than 360° in circumference, and if two such washers were held parallel and approached toward each other so that their end faces are juxtaposed, the end faces of the respective washers would pass each other and the washers would interlink.

But when the ends of these washers are extended so as to present the overhanging spur formations, then the washers would be more than 360° in circumference, and when approached toward each other as above set forth, the end faces could not pass each other and the washers would not interlink, and this result is brought about without really increasing the length of the segment which forms the washer, since the distance between the end faces is not changed, such distance being always less than the smallest cross section dimension of the washer stock.

It is not necessary that the depressions 4 be formed in the washer, since the stock to be displaced to form the spurs may be taken from any suitable part of the washer as will be clear from the following explanation, with special reference to Figures 3 and 4.

It will be noted that the washer 9 shown at Figure 3 does not have the depressions above referred to, and this washer may be formed from a helical segment such as is shown at Figure 4 and defined by the dotted lines 10 and the dotted sections 11, the stock of these sections being forced by a swaging operation to form the spurs 12 and the inclined faces 13, the latter being separated by a space that is less than the smallest cross section dimension of the washer stock.

The washer defined by the dotted lines 10 and the dotted sections 11 is less than 360° in circumference, as will be seen from the perpendicular line 14, and two such washers will interlink if approached toward each other in the manner above described, but, after the spurs have been formed as above, interlinking will not be at all likely, and in this instance, it will be clear that the segment has not been lengthened in the sense noted in my patent aforesaid, although the washer is more than 360° in circumference.

Both forms of the washer shown at Figures 1 and 3, are alike so far as their construction to prevent interlinking is concerned, and neither of these forms will interlink with a similar washer, if the two washers are approached toward each other at an angle with their end faces juxtaposed, since the spur formations will present obstructions that will render such interlinking extremely unlikely.

The end faces of washers which are angularly cut will meet the surfaces $a$ and $b$ respectively of the washer at acute and obtuse angles. In other words, the angular face of one end will intersect the plane of the surface $a$ of the washer at an acute angle and will intersect the plane of the surface $b$ of the washer at an obtuse angle, while the angular face of the other end of the washer will intersect the plane of the surface $b$ at an acute angle and the surface $a$ at an obtuse angle.

It is the acute angled portions of the washer ends that are extended into the spur-like formations, and this has the effect of increasing the circumference of the segment when measured in the manner above set forth, without changing either the distance between the end faces or their angle.

What is claimed is:—

A compression spring washer of the split ring type in the general form of a helical segment of substantially rectangular cross section, whose opposed ends are spaced apart a distance less than the smallest cross section dimension of the washer stock and are at angles to the washer faces, said ends being extended beyond the two respective faces of the washer to form overlapping spur portions.

In testimony whereof I affix my signature hereto.

CYRUS H. LOUTREL.